(No Model.)
J. KOEBERLE.
MEAT HOOK.
No. 340,050. Patented Apr. 13, 1886.
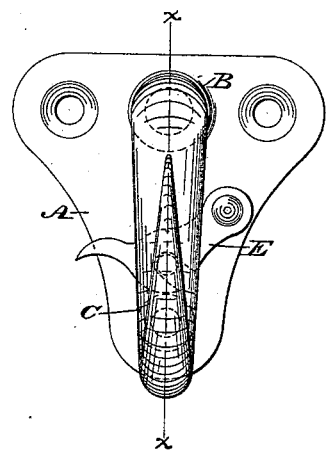
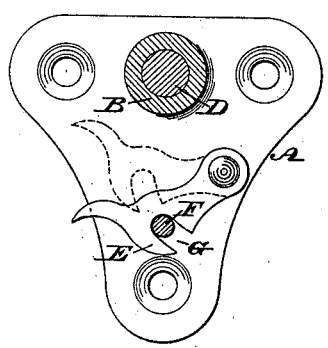
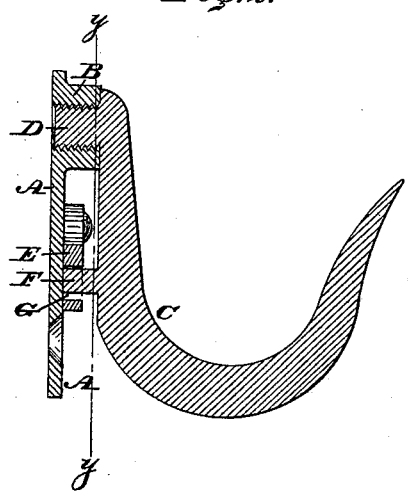
WITNESSES:
W. F. Kircher
A. P. Grant
INVENTOR:
John Koeberle
BY John A. Diederthein
ATTORNEY.

UNITED STATES PATENT OFFICE.

JOHN KOEBERLE, OF PHILADELPHIA, PENNSYLVANIA, ASSIGNOR TO THOMAS DEVLIN & CO., OF SAME PLACE.

MEAT-HOOK.

SPECIFICATION forming part of Letters Patent No. 340,050, dated April 13, 1886.

Application filed January 7, 1886. Serial No. 187,835. (No model.)

*To all whom it may concern:*

Be it known that I, JOHN KOEBERLE, a citizen of the United States, residing in the city and county of Philadelphia, State of Pennsylvania, have invented a new and useful Improvement in Meat-Hooks, which improvement is fully set forth in the following specification and accompanying drawings, in which—

Figure 1 represents a front view of a meat-hook embodying my invention. Fig. 2 represents a vertical section in line $x\,x$, Fig. 1. Fig. 3 represents a vertical section in line $y\,y$, Fig. 2.

Similar letters of reference indicate corresponding parts in the several figures.

My invention consists of a meat-hook provided with a threaded shank, whereby it may be readily screwed and unscrewed from the supporting plate, and of means whereby the hook is prevented from rotation.

Referring to the drawings, A represents a plate, which is adapted to be secured to a wall, stall, or other place where a meat-hook is required, said plate having at its upper end a boss, B, having a threaded opening.

C represents a meat-hook having at its upper end a threaded shank, D, which is screwed to the boss B.

On the face of the plate is a dog, E, which is pivoted to said plate, and on the back of the hook C is a lug, F, said dog having a slot, G, forming a catch, which is adapted to engage with the lug F.

When the meat-hook is required for service, it is screwed to the plate A, and thus securely sustained without liability to be disconnected therefrom, as it can only be removed by rotation, the weight of the meat or other material holding the hook in position. The dog E is moved against the lug F, so as to embrace the same, whereby the hook is prevented from rotation and retained immovable, especially during service.

In order to displace the hook, the dog is thrown back, thus releasing the lug, and the hook may then be rotated and unscrewed without interference of the dog, after which it may be stored away or otherwise disposed of, as desired.

Having thus described my invention, what I claim as new, and desire to secure by Letters Patent, is—

1. The combination of a meat-hook provided with a lug on its rear side, a supporting-plate to which said hook is removably attached, and a lock which is connected with the plate and engages with the lug of the hook, substantially as described.

2. The combination of a meat-hook having a threaded shank and a lug on its rear side, a plate having a threaded opening, and a dog or lock engaging with the lug on the hook for retaining the same in position, substantially as described.

3. The combination of a meat-hook having a threaded shank and a lug, a plate, A, with a threaded opening, and a dog, E, with slot G, pivoted to said plate and adapted to engage the lug, substantially as described.

JOHN KOEBERLE.

Witnesses:
JOHN A. WIEDERSHEIM,
A. P. GRANT.